Patented May 10, 1932

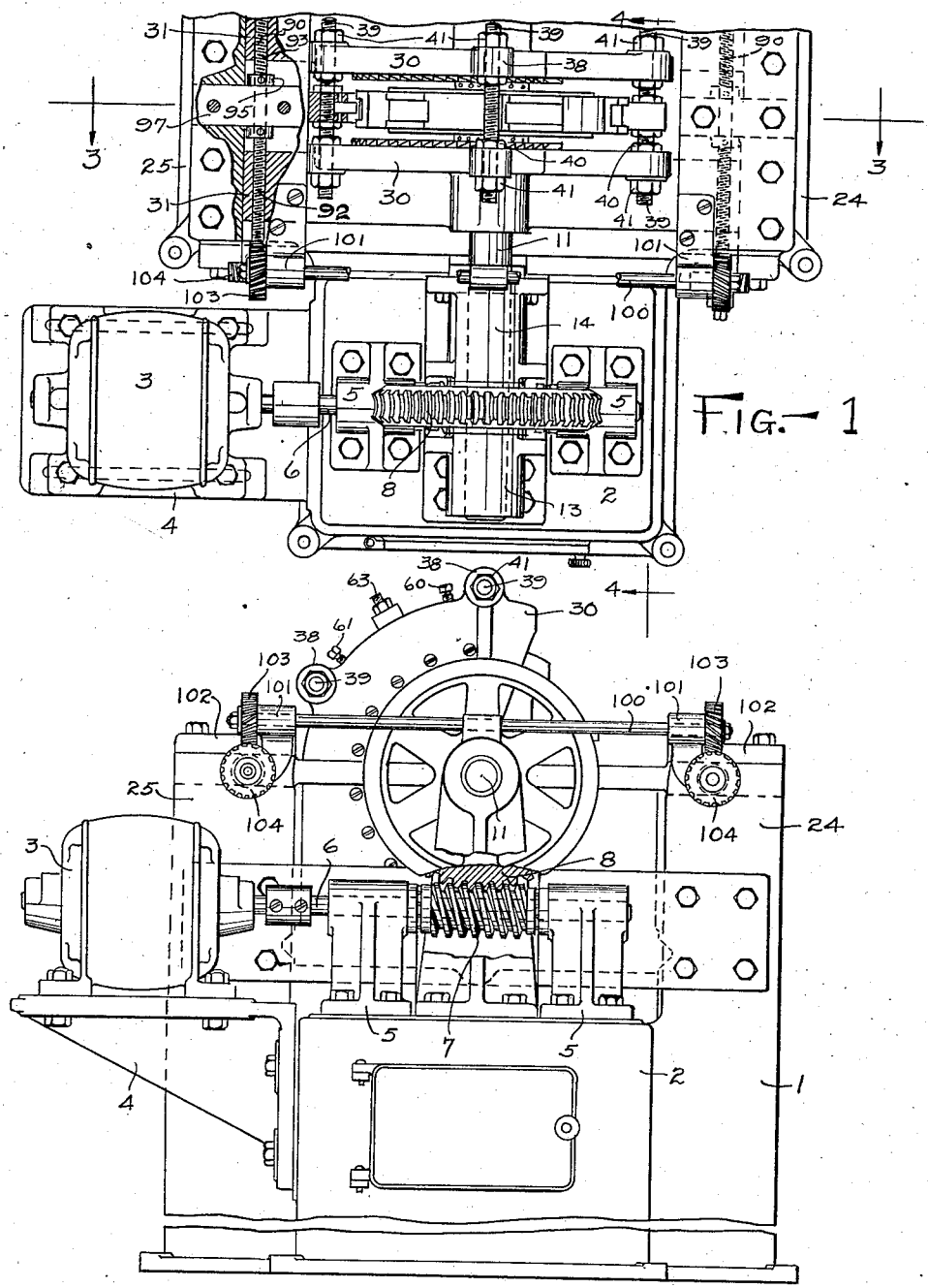

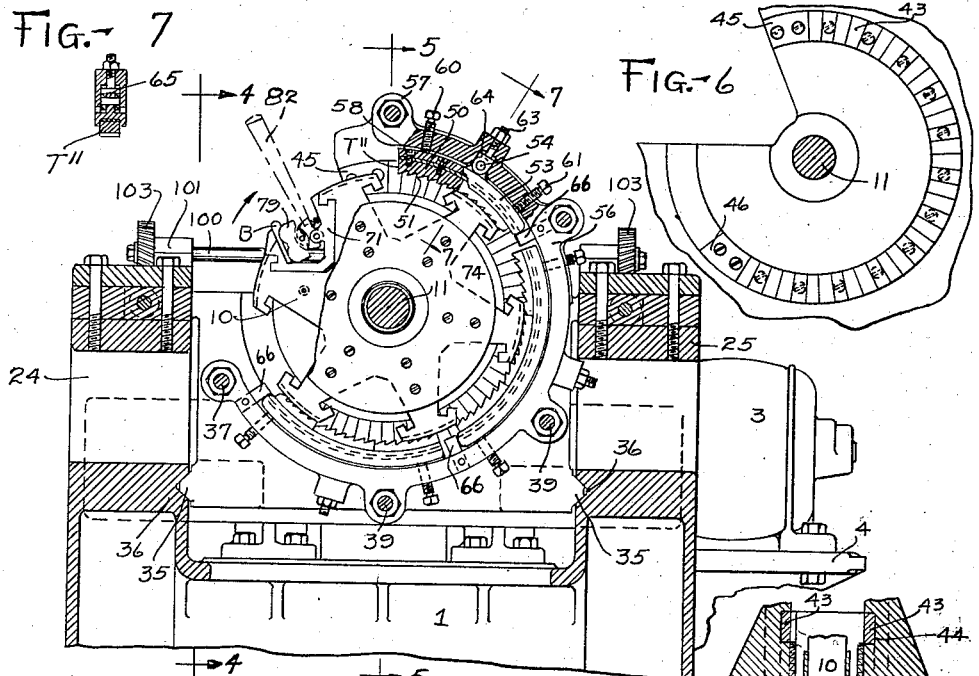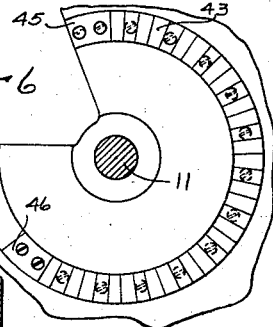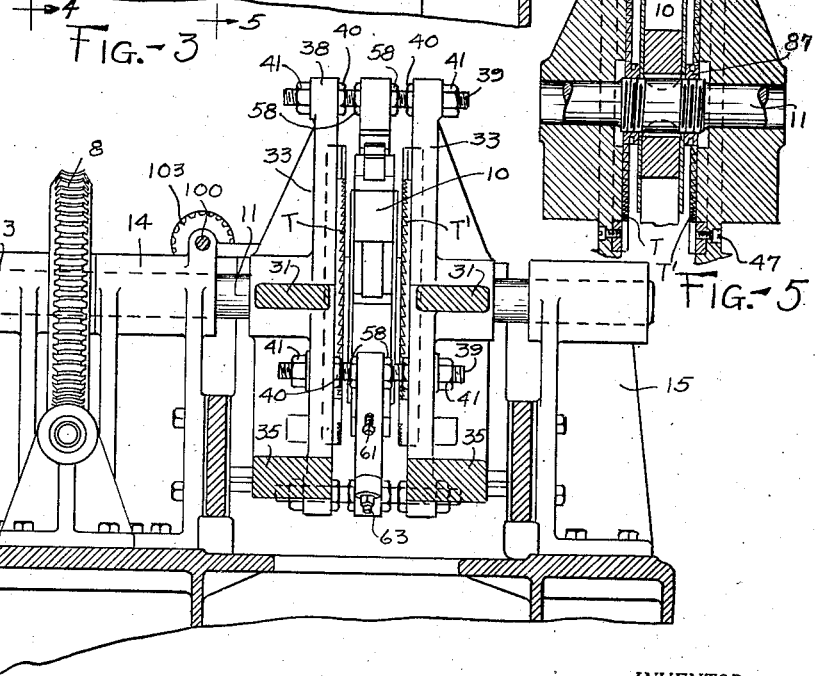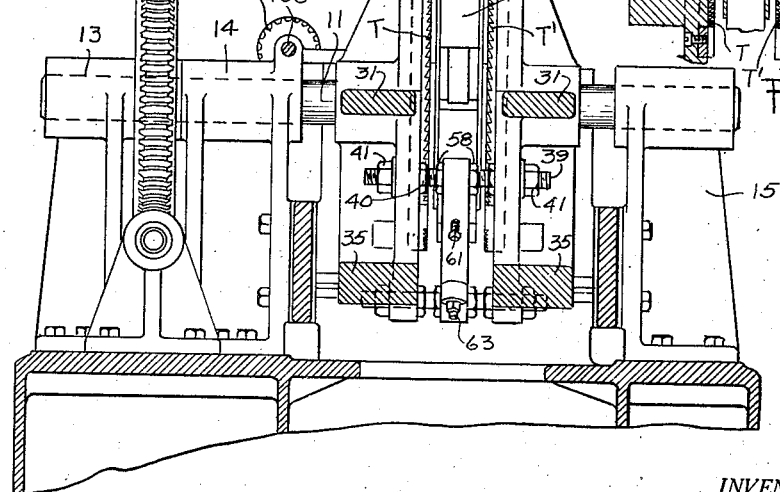

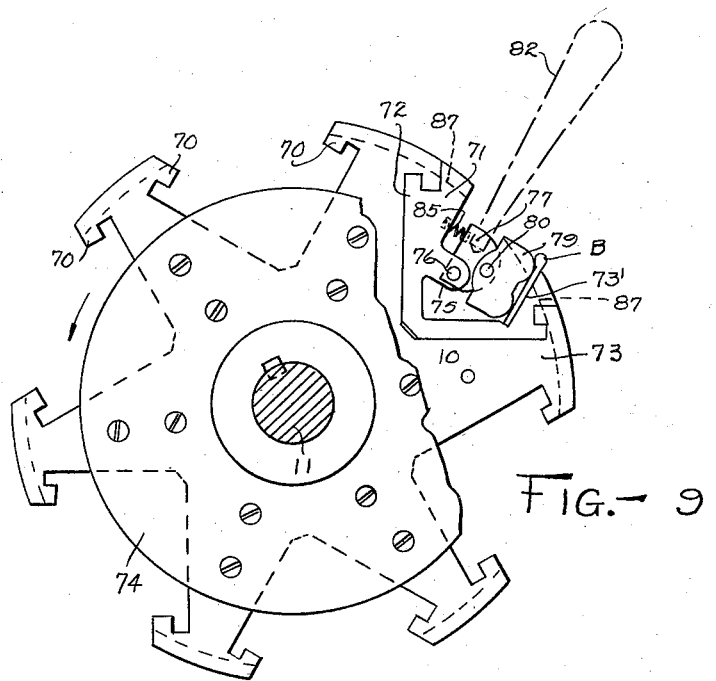
Fig.- 9
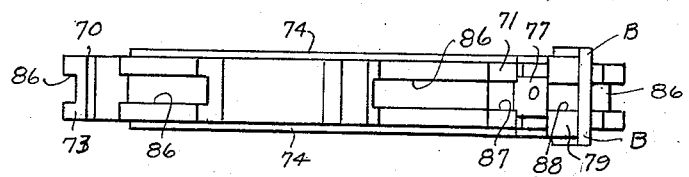
Fig.- 10
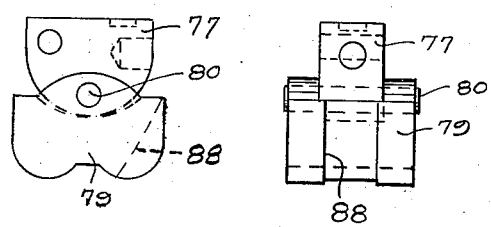
Fig.- 11
Fig.- 12

1,857,516

UNITED STATES PATENT OFFICE

JOHN OAKLEY, OF SPRINGFIELD, MASSACHUSETTS, ASSIGNOR TO PERKINS MACHINE AND GEAR COMPANY, OF SPRINGFIELD, MASSACHUSETTS, A CORPORATION OF MASSACHUSETTS

ROTARY BROACHING MACHINE

Application filed December 4, 1928. Serial No. 323,689.

This invention is concerned with rotary broaching machines, that is to say, machines in which a piece of work is held in a suitable rotary carrier and moved into operating contact with a broaching tool. As shown in the drawings, the machine is adapted for side surfacing and end slotting metal hinge blanks.

The essential object is to provide an improved broaching machine of the general character mentioned which shall be efficient in operation, comparatively easy to construct, and which will function automatically and continuously to perform broaching operations on successive blanks.

An important object is to provide a broaching machine in which the broaching tools are very easily accessible both for removal and replacement and for adjustment.

A further object is to provide in connection with a broaching machine, a support for broaching tools which will enable the depth of cut of each of several cutting teeth to be altered, though formed on a single bar of metal.

A further object is to provide a movable support for a broaching tool which will enable the tool to be considerably adjusted for different sized blanks, yet which is capable of being rigidly locked for continuous operation by very simple means.

A further object is to provide a device for adjusting a plurality of broaching tools toward and away from a piece of work in such manner that all portions of each tool are maintained in proper relation to the corresponding portions of another tool.

Further objects include an effective arrangement of parts in a broaching machine, whereby work may be rapidly and uniformly operated upon for long continued periods without attention on part of the operator, other than to supply work to the machine.

Other objects and features of the invention will become apparent from the following description relating to the accompanying drawings, which show the preferred form. The essential characteristics are summarized in the claims.

In the drawings, Fig. 1 is a fragmentary plan view of the machine, a portion of the machine being broken away to show certain details of the construction; Fig. 2 is an end elevation of the machine; Fig. 3 is a transverse cross sectional view taken along the line 3—3 on Fig. 1; Figs. 4 and 5 are longitudinal cross sectional views taken along the lines 4—4 and 5—5 respectively on Fig. 3; Fig. 6 is a fragmentary side elevation of one of the broaching tools; Fig. 7 is a detail cross sectional view as indicated by the line 7—7 on Fig. 3; Fig. 8 is a perspective view of a blank to be broached; Fig. 9 is an end elevation of the work carrier; Fig. 10 is a plan view of the mechanism shown in Fig. 9, and Figs. 11 and 12 are detailed views of a suitable blank positioning and holding device.

In general, the mechanism shown comprises a suitable base supporting the broaching tools and on which the work carrier is rotatably mounted. The work carrier is peripherally recessed to support jigs in which a plurality of pieces of work are supported for movement past the broaching tools. Power is applied to the work carrier from a motor, through suitable reduction gearing, to move the blanks into coaction with the tools. The broaching tools include a pair of oppositely positioned arcuate toothed plates or sets of plates mounted in such manner that the plates may be moved toward and away from the plane of the rotary work carrier for side cutting the work.

In addition to the tools just mentioned, there are broaching tools, arcuate in form and adjustably held in position to slot or otherwise cut the blanks to form the desired contour for the finished pieces. The tool holding mechanism includes a device for simultaneously moving the side cutting tools toward and away from the plane of rotation of the work carrier, and for locking the thus adjusted tools firmly in operating position.

Referring in detail to the drawings, a suitable base is indicated at 1, extended as at 2 to provide a support for the power unit and gearing. This comprises a motor 3 on a shelf bracket 4, the armature shaft of the motor being virtually extended as at 6 through a pair of brackets 5 on the base portion 2. To reduce the effective speed of the motor, the shaft extension 6 carries a worm 7 meshing with a worm gear 8 rigidly supported on a shaft 11 extending longitudinally across the top of the machine, and which supports the work or blank carrier 10.

The work carrier shaft is supported by brackets designated 13, 14 and 15, these being well shown in Fig. 4. The brackets 13 and 14 are disposed on opposite sides of the worm gear 8 and rest on the base extension 2 and the bracket 15 is disposed beyond the work carrier, as shown.

While it is to be understood that the machine is arranged for operation on practically any type of blank, the blank to which the mechanism is specifically adapted for broaching is an automobile door hinge member. A female hinge member of this type is indicated at B in Fig. 8. The blanks for forming such hinge member may be formed from long strips, having an enlarged rib at one side running lengthwise of the strip, by cutting the strip up into sections. The enlarged portion as it appears on one of such sections is designated b. It may be assumed that such long strip is cut up into sections either by a shearing or sawing operation, and it will be easily seen that such severing operations cannot be depended upon to leave the blank of the proper dimensions and finish. Part of the broaching operation accomplished in the present machine is to face off the sides of such sections to secure the desired size and finish of the hinge. One of the side surfaces is indicated at f in Fig. 8. In addition to side surfacing the blank, it is desired to slot the end of the blank through the enlarged portion b for the reception of the male member of the hinge. The machine shown also slots the blank and the surfaces formed in this operation are indicated at f' and f''.

The specific manner in which the blank is held in the work carrier will be hereinafter described, but for the present it is to be understood that the blanks are carried in jigs on the work carrier 10 with the surfaces f facing longitudinally of the machine and the enlarged portions of the blank b extending outwardly from the work carrier. The broaching tools for finishing the surfaces f are positioned in carriers, to be presently described, on opposite sides of the plane of rotation of the work carrier, and the broaching tool for slotting the blank, as at f' and f''; embrace the work carrier, that is to say, are positioned radially outwardly from the carrier. The side surfacing broaching tools are designated T and T', and the slotting tools T''.

The support for the broaching tools T and T' comprises in part upstanding portions 24 and 25 of the machine base 1. These upstanding portions of the base have their top surfaces formed to provide slideway supports for two broach supporting frames, designated generally at 30. The frames have horizontal extensions at 31 which movably rest on the top surfaces of the base portions 24 and 25. The frames 30 further have central disc like frame portions 33 which directly support the broaching tools T and T' on opposite sides of the work carrier. As shown, the broach supporting frames 30 are provided with lateral guides 35, below the extensions 31, which engage slideway grooves 36 formed in the base extensions 24 and 25, as shown in Figs. 2 and 3. Means to be hereinafter described are provided to move the frames 30 toward and away from each other.

In order that the broach supporting frames 30 may be locked in adjusted position, the frame portions 33 carry frame connecting threaded bars 39. Each bar extends through the two frame portions 33, from one to the other, and carries lock nuts 40 bearing against the adjacent surfaces of the frame portions 33, and similar lock nuts 41 on the outer surfaces of the respective frame portions.

The broaching tools T and T' may be conveniently supported in the broach holding frame portions 33, as shown particularly in Figs. 5 and 6, wherein each tool is illustrated as an arcuate bar of metal 43 on which suitable teeth are formed, the bars being supported in suitable grooves in the respective frame portions. As illustrated, there are end thrust blocks 45 and 46 suitably secured in place at the respective ends of each arcuate bar, see Fig. 6. The bars may be held onto the tool carrying frames by means of machine screws 47 entering the bars from outside of the frame portions 33, as shown in Fig. 5.

It is to be understood that the bars 43 are formed with teeth at varying elevations from the body portions of the bars, so that as a work blank is carried around on the carrier 10, in the direction of the arrow shown in Fig. 3, the side surfaces f of the blank will be progressively cut, the lower teeth being near the uppermost portion of the bars 43, as viewed in Fig. 6, and the higher teeth being near the bottom-most portion of the bars, as viewed in this figure.

The tools T'' for end finishing or slotting the blanks are best shown in Figs. 3 and 7. As shown, there are a plurality of these tools and each comprises arcuate sectional bars 50, suitably toothed as at 51 and held in place on a holder 53 which is adjustably pivoted as on pins 54 to a C-shaped tool supporting frame 56 partially surrounding the work holder 10. The frame 56 has ear portions 57 having through openings for embracing the threaded bars 39, whereby the frame member 56 is rigidly supported in place by the tool carrying frame portions 30. As shown, suitable nuts 58 on the threaded bars 39 serve to hold the tool carrying frame member 56 in adjustably fixed position on the bars.

It will be understood that with the pivotal arrangement for holding the tools T″, these tools may be made with their teeth substantially of equal height while each pivoted tool carrier 53 may be swung on its pivot 54 as by the use of set screws 60 and 61 in the frame 56 to cause the teeth which first engage the blank to be, in effect, lower than the teeth which subsequently engage the blank. In other words, the teeth which first engage the blank will be radially disposed farther from the axis of the shaft 11 than the subsequently engaging teeth of a given bar 50. Suitable means for adjusting the radial position of all the cutting teeth of a given bar or set of bars may include the pivotal connection between the carriers 53 and frame 56. This, as shown, comprises bolts 63 extending inwardly through the frame 56 and having bifurcated heads 64 embracing radially extending ears 65 on the carrier members 53, through which heads and ears the pivot pins 54 pass.

It is desirable to definitely locate the tool carriers 53 against arcuate shifting movement during the broaching operation, and for this purpose I may provide abutment pins 66, one for each tool carrier 53, these being suitably secured in position, as shown in Figs. 1 and 3, in radial openings in the frame 56.

The preferred form of work support comprises a work carrier member 10 previously mentioned, and shown as a star-shaped wheel having overhanging projections 70 at the end of each point of the star. The carrier 10 may be keyed to the shaft 11 as shown in Fig. 5 and held in place against longitudinal movement by abutment nuts 87. The projections 70 serve to hold suitable jig members 71 in place. Only one jig member 71 is shown. The jigs are slid into place in engagement with the projections 70 by movement parallel to the axis of the shaft 11 in which position they may be secured by removable circular end plates 74 screwed to opposite sides of the member 10.

Each jig member 71 is generally triangular in shape and has arms 72 and 73 respectively underhanging the projections 70. One of these arms namely 73, is surfaced as at 73′ to hold a blank with the enlarged portions b thereof extending outwardly from the member 10. The other arm carries a pair of ears 75 which embrace and provide a pivotal support at 76 for a rocking link 77. The link carries on its free end a clamping foot 79 which engages the face of the hinge blank opposite the surface 73′. This foot is pivoted to the link 76 as at 80. In order to place work in a jig, the link 76 may be rocked as by a removable handle member 82 engaging a suitable aperture in the link to withdraw the foot 79 from contact with the piece of work. When the handle is thereafter withdrawn from the link a suitable spring, such as 85 reacting against the arm 71 of the jig serves to hold the foot 79 against the blank. It will be seen that due to the direction of rotation of the work carrier 10 and the angular position of the blank relative to the carrier and tools, the force exerted by the action of the broaching tools on the blank tends to seat the blank against the jig, hence, very little force is required to hold the blank in place.

It will be understood that adequate clearance is provided for the tools T″ centrally of the carrier 10, the arms of the jig and the work holding foot member 79. As shown, the member 10 is peripherally grooved at 86, the arms of the jig at 87 and the foot member at 88.

As previously noted, it is desirable to adjustably position the tools T and T′ toward and away from the blank carrier. For this purpose, I provide two longitudinally extending screws 90, one at each side of the machine, each of which have right and left hand threaded portions indicated at 92 and 93. The right hand threaded portions of both screws, as shown particularly in Fig. 1, engage the horizontal extensions 31 of one of the broach carrying frames 30 and the left hand threaded portions of the screws engage extensions 31 of the other frame 30. By reason of this, rotation of the screws 90 in one direction will bring the two carriers together, and rotation in the opposite direction will spread them apart. The shafts 90 may be suitably held against longitudinal movement as by collars 95 at each side of respective fixed blocks 97 secured to the respective upstanding base portions 24 and 25.

In order to simultaneously rotate the screws 90 in the desired direction, I provide a cross shaft 100 mounted in brackets 101 on cap plates 102 surmounting the base extensions 24 and 25 and forming part of the slideway for the broach carrier extensions 31. The shaft 100 has two gears 103 which mesh with respective gears 104 rigid with respective screws 90. Suitable means for turning the shaft 100 may be provided, such as a hand wheel (not shown) fixed to the shaft 100, or I may provide hand wheels (not shown) on either or both of the screws 90. It is obvious that turning either of the screws 90 or the shaft 100 will, through the gearing and threaded relationship of the screws to the tool carrying frames 30, result in moving the tools T and T′ toward or away from the work, as desired. In making such adjustment, the nuts 40 and 41 have obviously to be loosened, and after the adjustment, the two frames 30 are made virtually rigid with each other by resetting these nuts.

It will be clear from the above that removal of all the tools T, T′ and T″ as for sharpening is a very easy matter. For example, the open character of the tool carrying frames and main support permits access to the tool holding screws, such as 47, and after their removal the tools T and T′ may be easily reached and removed, the frames being spread apart to permit the latter removal. The tools T″, notwithstanding their close proximity to the work and adjacent parts, may also be easily reached and removed when necessary without dismantling the C-shaped frame 56. This is accomplished by simply moving one of the carriers 30 away from the work and then moving the frame 56, while on the supporting bars 39, out of radial alignment with the work and toward the moved carrier 30. Afterward the holders 53 may all be taken out by simply removing the nuts from the bolts 63.

With the above described arrangement, both the broaching tools T and T′ may be ground and used until completely worn out, it being only necessary to adjust the frame members 30 toward each other the required distances after each grinding of the tools. The gearing and screw arrangement insures that the tool supports will remain parallel to each other.

It will be further seen that by the adjustment arrangement provided, the tool carrying frame 56 for the tools T″ as well as the work carrier may be adjusted toward or away from either of the tools T or T′. Thus, in the event that the tool T, for example, becomes broken and has to be replaced by a new one, the other side broaching tool T′ may remain in place, the tool T″ being simply reset by moving the C shaped frame 56 along the threaded bars 39 in one longitudinal direction or the other as required, and the work carrier being correspondingly moved along the shaft 11. The arrangement further makes possible the end broaching operation on a hinge blank or the like, wherein one arm of the hinge has to be wider than the other.

It will be further seen that by the arrangement of mounting for broaching tools such as T″, the formation of these tools is greatly simplified, and the depth of successive cuts on the blank may be varied without changing the tool formation. Further, it will be apparent that by the arrangement of work support, I have provided a mechanism wherein work may be easily and quickly taken out and replaced, and which will require no complicated mechanism for locking the piece while being broached, particularly since the cutting force reactions tend to seat the work more firmly in the jigs rather than to tend to displace the work.

I claim:

1. In a broaching machine, a rotary carrier and shaft therefor, a pair of broach holding frames positioned in surrounding relation to the shaft and movable along the same, a plurality of threaded bars circumferentially arranged and connecting the frames, means on the bars bearing against each frame from opposite directions to lock the frames together and a broach holding member carried by the bars between the said frames and adjustably positionable along said bars.

2. In a broaching machine, a bed, a rotary work carrier adapted to position work to coact with an arcuate broaching tool disposed radially outwardly from the carrier, and means pivoted intermediately of the ends thereof to the bed on which the broaching tool is positioned, there being means on the bed acting inwardly on the first named means at circumferentially spaced points to swing said first named means on its pivot to thereby variably adjust the cutting operation of the broach and hold the broach rigidly in operating position.

3. In a broaching machine, a rotary work holder, broach holding frames on opposite sides of the work holder, a third frame positioned outwardly from the holder, circumferentially-spaced means on said first named frames rigidly supporting said third frame, means on said circumferentially-spaced means for moving said third frame longitudinally of the work holder axis, and means for correspondingly adjusting the work holder along its axis in conformance with the adjustment of said third frame.

4. In a broaching machine, a support, a work carrier movably mounted on said support, a bed carried by said support adjacent the work holder, and a broaching tool mounting positioned between said bed and holder, there being means on the bed pivotally supporting the mounting and arranged to bodily move the mounting toward and away from the holder, and means associated with the bed and acting on opposite sides of the pivot axis for rigidly holding the mounting in various swung positions about the pivot axis.

5. In a broaching machine, a rotary work holder, rigid means outwardly from the holder and arranged to support a broach, the support comprising a lengthwise adjustable member carried by said rigid means and having a pivotal connection with the broach, and set screws on opposite sides of the pivot axis and carried by said rigid means for swinging the broach and locking the same in swung position, to thereby increase or decrease the depth of successive cuts on the work as desired.

6. In mechanism of the kind described, a rotary work holder comprising a peripherally recessed wheel having radially overhanging members, jig members seated in said recesses by movement in the direction of the work holder axis and retained against radial movement by said overhanging members, and means secured to said wheel in overlying relation to all of said jigs for holding the jigs in place.

7. In mechanism of the kind described, a rotary work holding member having circumferentially-spaced peripherally disposed recesses, means in said recesses providing a rigid support for work, and yielding means substantially entirely within said recesses and arranged to hold the work on the support, each of said yielding means comprising a work presser foot, a link pivotally mounted on the first named means and pivotally attached to the presser foot, and a spring bearing against the link to hold the presser foot in contact with the work.

8. In mechanism of the kind described, a rotary holder comprising a star-shaped wheel having overhanging members at the points of the star, jigs positioned between such points and underhanging the said members and retained on the wheel thereby, each of said jigs comprising an outwardly recessed member having a forwardly inclined surface with relation to the direction of rotation of the holder, and yielding means within each of said jig members including a presser foot having a resiliently biased link connection with the jig for holding the work in position.

9. In a broaching machine, a rotary work carrier, a driving shaft therefor, a pair of frames positioned in a surrounding relation to said shaft on opposite sides of said carrier and movable along the axis of said shaft, adjustable means inter-connecting said frames and arranged to lock the frames in a definite spaced relation to each other, and a tool holding member carried by said means between said frames and adjustable relative to said frames to position the tool parallel to the axis of the carrier.

In testimony whereof, I hereunto affix my signature.

JOHN OAKLEY.